United States Patent [19]
Jensen

[11] 3,898,657
[45] Aug. 5, 1975

[54] HIGH FREQUENCY RADAR

[75] Inventor: Garold K. Jensen, Alexandria, Va.

[73] Assignee: The United States of America as represented by the Secretary of the Navy, Washington, D.C.

[22] Filed: Dec. 24, 1968

[21] Appl. No.: 790,503

[52] U.S. Cl............................................ 343/8; 343/9
[51] Int. Cl.² ............................................ G01S 9/44
[58] Field of Search .................................... 343/8, 9

[56]         References Cited
        UNITED STATES PATENTS
3,228,028    1/1966    Baum et al............................ 343/9

3,309,700    3/1967    Garrison ................................ 343/8

*Primary Examiner*—Malcolm F. Hubler
*Attorney, Agent, or Firm*—R. S. Sciascia; Arthur L. Branning

[57]           ABSTRACT

A HF pulse doppler radar which eliminates the usual extent and direction ambiguities in velocity and acceleration measurements that are in excess of PRF/2. This is accomplished by preserving the complete spectral response obtained at IF for use in the signal processor and by circumventing the spectral folding which normally occurs in the product detector of the receiver and by counting the spectral responses in the upper and lower sidebands.

9 Claims, 6 Drawing Figures

APPROCHING
LOW VELOCITY
TARGET
RECEEDING
LOW VELOCITY
TARGET
APPROCHING
HIGH VELOCITY
TARGET
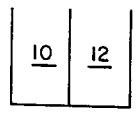
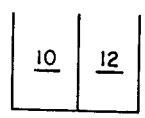
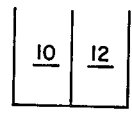
BANDPASS FILTERS
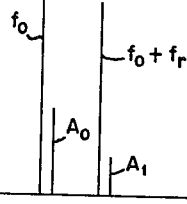
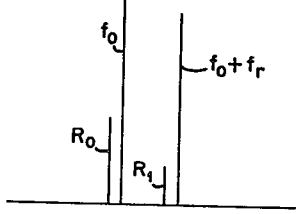
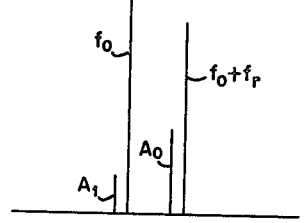
FIG. 2A
FIG. 2B
FIG. 2C
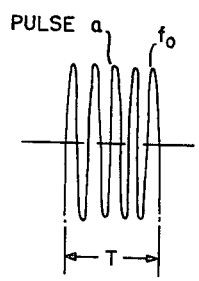
FIG. 1
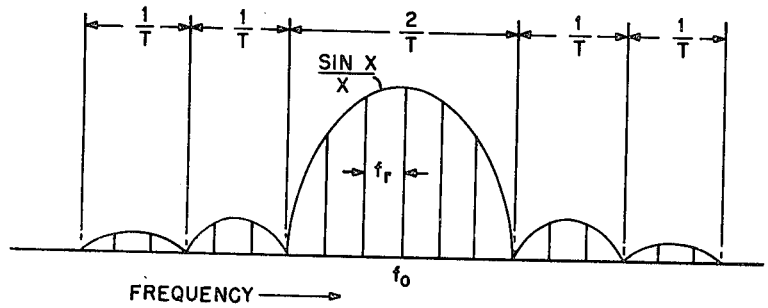
INVENTOR
GAROLD K. JENSEN

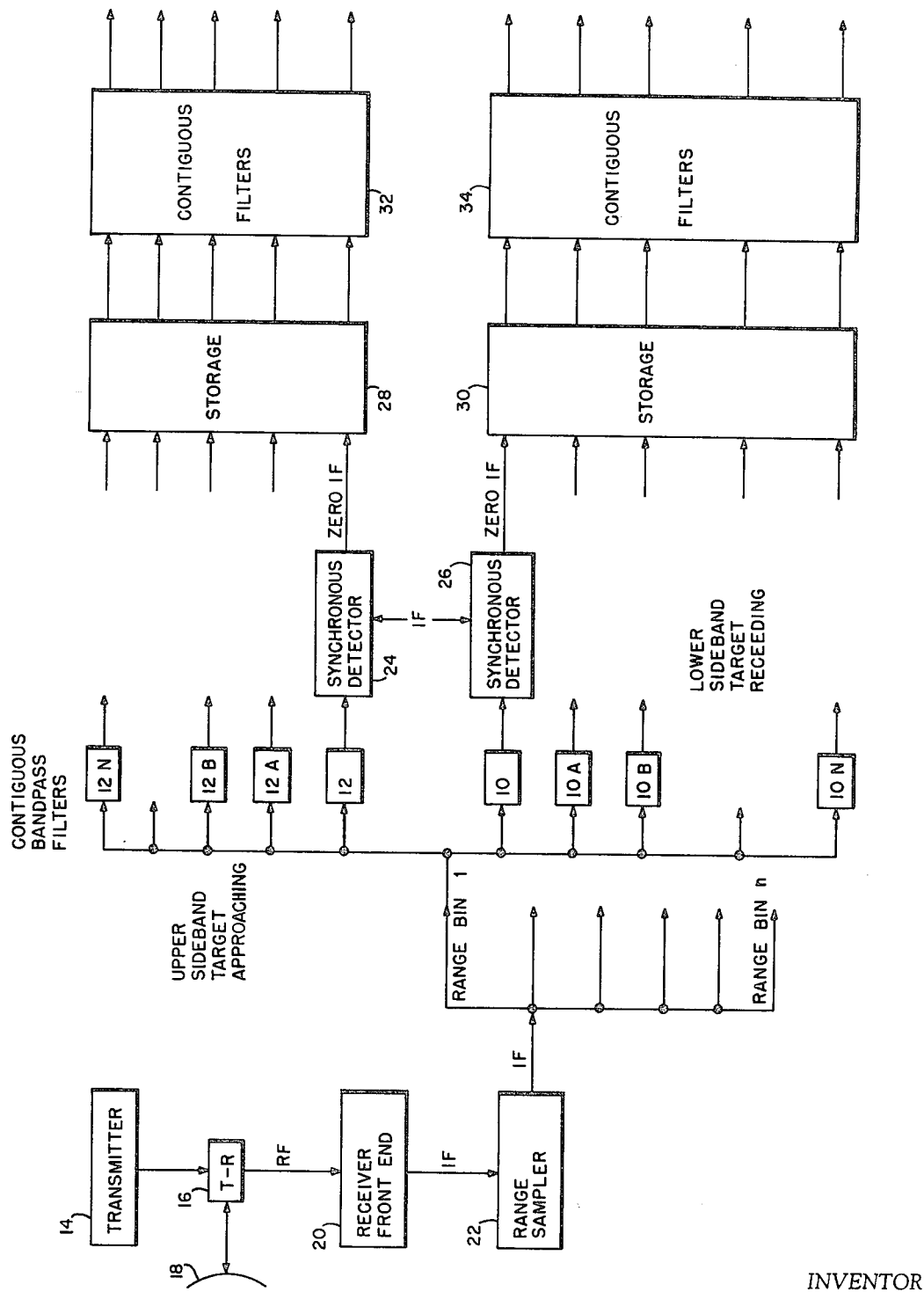

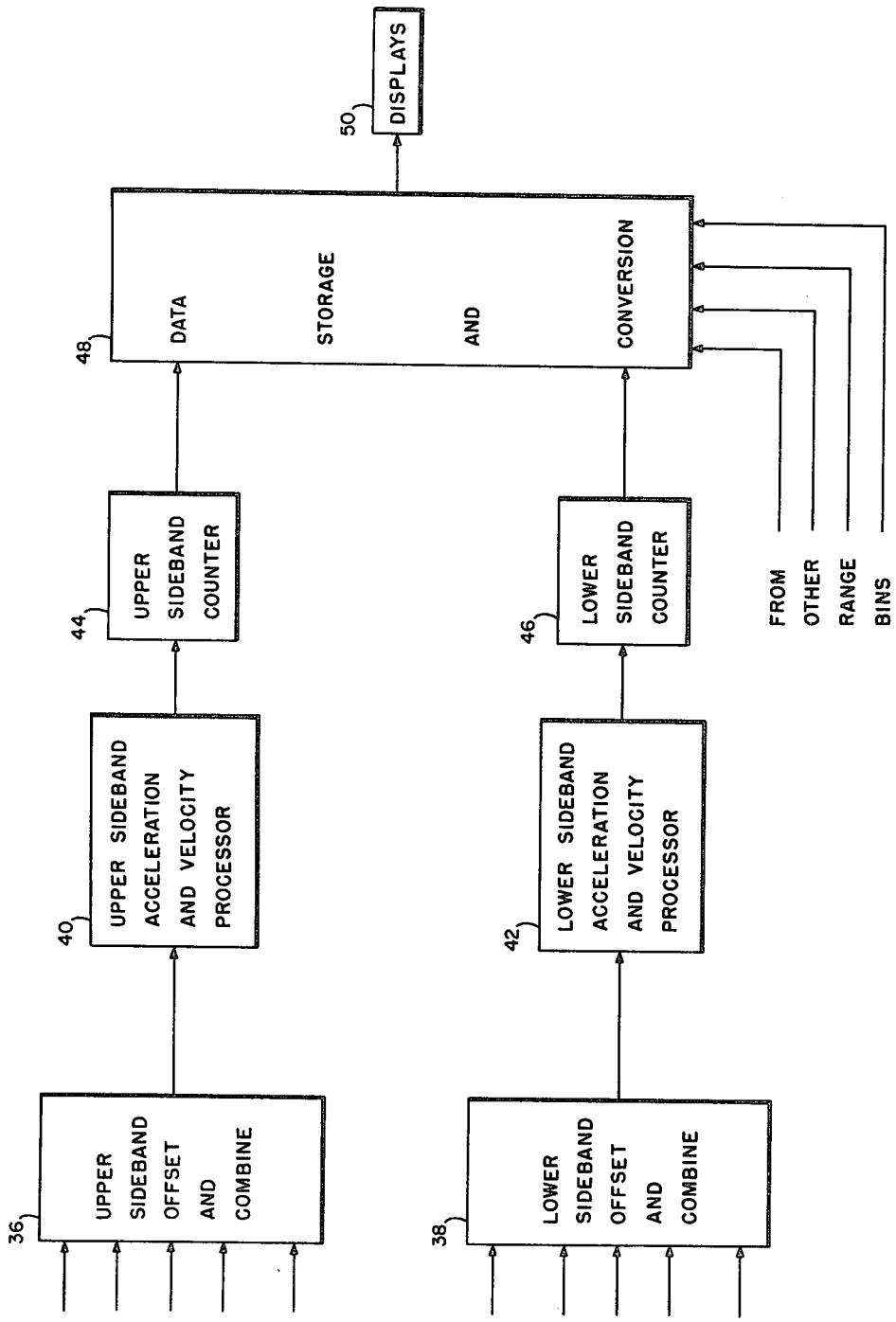

HIGH FREQUENCY RADAR

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

It will be evident that aspects of the invention described herein have utility in many different types of radar. However, the invention will be described in connection with and pertains primarily to pulse doppler radar which uses HF energy, i.e., energy which is reflected by the ionosphere, and therefore is capable of detecting very distant targets by recovering extremely weak signals from much stronger noise.

Following World War II, much effort was devoted by this nation to the development of long range, over-the-horizon, radar. In these pioneer o-t-h systems, the design of the signal storage and display systems was related, in terms of range increments and doppler filtering channels, to the anticipated targets of that period, that is, to manned aircraft having velocities and accelerations which are small when compared to the performance parameters of present day missile targets.

Characteristically, the signal storage of these pioneer radar comprised a magnetic drum which was divided into 23 sectors or range bins. Echo signals were continuously sampled at 23 ranges and the samples inserted into the drum in such a manner that as new samples were added the older signals were removed. Because it was sufficient for the needs of the period and because of the physical arrangement, ie the magnetic drum, the signal content of each drum segment, or range bin, was read out in sequence, bin by bin, and separated by range and doppler characteristics into velocity bins.

The advent of the ICBM rendered these pioneer o-t-h radar obsolete, both because of the slowness of the signal read-out and processing and because the return from a single target would no longer be in a single velocity bin but the energy thereof would be "smeared" into several velocity bins.

Modern o-t-h radar, such as the Naval Research Laboratory experimental MADRE radar, often include two major improvements which are required by the large accelerations and high velocities of missile targets. One of these improvements, which is described in more detail in patent application, Ser. No. 285,555 for RADAR SYSTEM filed on May 1963 31, 1953 by Garold K. Jensen and James E. McGeogh, matches the acceleration pattern of the target and thereby puts all (or most of) the target echo energy in a single velocity bin. This, of course, enables the recovery of very weak signals. The second of the referred to improvements, which is described in more detail in patent application, Ser. No. 649,792 for RADAR DATA CONVERTER AND DISPLAY SYSTEM filed June 27, 1967 by Garold K. Jensen, replaces the magnetic drum storage by a capacitor matrix storage. This improvement enabled a more rapid readout of data by simultaneous (as contrasted to the prior sequential) analysis of the contents of all the range bins and a more sophisticated display arrangement.

SUMMARY OF THE INVENTION

The present invention is a further improvement to the above described o-t-h radars which were ambiguous because of spectral folding when the doppler frequency exceeded one-half of the pulse repetition frequency (PRF/2) and because prior radars failed to distinguish between approaching and receeding targets. The invention described herein eliminates these ambiguities by the addition of components which function to maintain doppler frequency shift continuity through the detection process and to provide a count of the number of spectral (distinct frequency) responses above and below the zero-velocity center frequency. A preponderance of upper sideband spectral responses is indicative of an approaching target while a lower sideband preponderance is indicative of a receeding target.

OBJECTS OF THE INVENTION

It is, therefore, an object of the present invention to provide an improved over-the-horizon radar.

Another object of the invention is to remove the target direction ambiguity which arises in prior o-t-h radars when the doppler frequency equals or exceeds PRF/2.

A further object is to provide a continuous doppler extent without the ambiguity caused by the spectral folding that normally occurs in the product detector.

Yet another object is to provide a continuous doppler extent without the ambiguity caused by the spectral folding that normally occurs in the product detector by preserving the complete spectral response through the detection process.

A still further object is to provide an o-t-h radar which counts the number of spectral responses in the upper and lower sidebands and thereby provides an indication of whether high velocity targets, which produce doppler frequencies equal to or in excess of PRF/2, are approaching or receeding.

DESCRIPTION OF THE DRAWINGS

The exact nature of this invention as well as other objects and advantages thereof will be readily apparent from consideration of the following description of a preferred embodiment relates to the annexed drawings in which:

FIGS. 1, 2A, 2B and 2C are diagrams which are useful in understanding the invention, and FIGS. 3A and 3B illustrate the invention in block diagram form.

DESCRIPTION OF THE PREFERRED EMBODIMENT

Referring now to the drawings, wherein like reference characters designate like or corresponding parts throughout the several FIGS. In FIG. 1 is shown a single pulse a which is typical of the pulses that are continuously radiated by a pulse doppler o-t-h radar. As shown, pulse a has a duration of T and a carrier frequency of $f_o$. For ease of discussion, the symbol $f_o$ will be used for the center carrier frequency at both r-f and i-f. Pulses similar to pulse a are continuously radiated at a repetition frequency (PRF) which for ease of illustration will also be termed $f_r$.

By Fourier-series expansion techniques it can be shown that pulse $a$ of FIG. 1 is a combination of component signals which have frequencies of $f_o$ and $f_o \pm nf_r$ where $n$ represents the various positive integers and that the amplitude of the component signals is defined by a $\sin x/x$ type envelope curve that equals zero at frequencies ± $n/T$ from $f_o$. This Fourier expansion is illustrated in frequency spectrum form in FIG. 1 where for ease of illustration the spectrum has been limited to only six zero values and an unrealistically small number of frequencies have been shown between the various zero points. In o-t-h radar the transmitter output is usually further modified by a $\cos^2$ time weighing in order to reduce the amplitude of the sidelobes.

Referring now to FIG. 2A which symbolically shows two sectors 10 and 12 of a contiguous filter, the filter sector 10 having a bandpass of $f_r$ centered at $f_o$ which may be either r-f or i-f and the filter sector 12 having a bandpass of $f_r$ centered at $f_o + f_r$. The frequency components $f_o + f_r$ are components of the pulse a as previously described in connection FIG. 1. These component signals, upon being reflected by a low velocity target which is approaching, will be received with a small positive doppler frequency shift and are illustrated in FIG. 2A as $A_o$ and $A_1$. By conventional techniques information concerning the velocity and accleration of the target can be obtained from the echo components $A_o$ and $A_1$.

FIG. 2B is a similar diagram related to a receeding low velocity target. As shown, the echo components $R_o$ and $R_1$ include a small negative doppler frequency shift.

It will be apparent to the reader that in FIGS. 2A and 2B the echo components, such as $A_o$ and $R_o$, remain within the bandpass of the associated filter sector, such as 10 and that the doppler frequency shift is unambiguously indicative of the velocity of the target and of whether it is approaching or receeding.

FIG. 2C is representative of an approaching higher velocity target wherein the positive doppler frequency shift is so large that the $A_o$ echo component is no longer in the bandpass of filter sector 10 but is in the bandpass of filter sector 12 and can be mistakenly interpreted as being an echo component from a low velocity receeding target as could the lower sideband echo component $A_1$ which would appear in the filter sector 10. Such ambiguity arises whenever the doppler frequency shift equals or exceeds $f_r/2$ (i.e., PRF/2).

It should be recognized that, for ease of illustration, FIG. 2C is merely representative. Typically, with the relatively low PRF of modern o-t-h radars and the exceedingly high velocities of ICBM missiles, the echo components of the frequency spectrum of FIG. 1 would be shifted many $f_r$ increments, and in terms of radar structure, many filter sectors.

Prior o-t-h radar, partly as a reflection of the needs and the designs of the pioneer radar and partly because of limitations imposed by design complexities, size, cost, etc., did not preserve the full spectral response but confined the detection process to the ± PRF/2 doppler band. As a result, and as is evident from FIG. 2, the prior o-t-h radar were ambiguous in both velocity and direction indications.

FIGS. 3A and 3B illustrate a preferred embodiment of the invention in block diagram form. In FIG. 3A the transmitter 14, T-R device 16, antenna 18 and receiver front end 20 function and cooperate in conventional manner and need not be described beyond stating that the transmitted pulse may be long, so as to minimize the number of spectrum lines in FIG. 1, and that the echo thereof may be modified by well known pulse compression techniques in the component 20. Also the customary heterodyning is accomplished in the receiver front end unit 20 so that the output thereof is at the receiver IF. Range sampler 22 is also conventional and has been described in the previously mentioned prior applications. Sampler 22 functions to periodically and sequentially connect the component 20 to the range bins 1 through n and which typically may be on the order of 250 in number. In other words the component 22 chronologically separates the echo returns from each pulse a so that target echoes which are received at certain times are commutated into the appropriate range bins. Only one such range bin is shown in any detail in FIGS. 3A and 3B but the reader should realize that much of structure shown in block diagram form in FIGS. 3A and 3B is duplicated in each of the other, non-illustrated, range bins.

The input of each range bin, such as the range bin No. 1 illustrated, includes a contiguous bandpass filter with upper sideband sectors 12, 12A, 12B .... 12N and lower sideband sectors 10, 10A, 10B .... 10N. As previously discussed in connection with FIGS. 1 and 2, each of these filter sectors has a bandpass equal to the PRF ($f_r$). The number of sectors, as determined by design decision, is such that the adjacent bandpasses of the filter sectors span the expected frequency reception range, i.e., include the highest to the lowest expected received frequency components, including the doppler frequency shift. The outputs of each filter sector are applied to synchronous detectors, such as 24 and 26 wherein, by preserving coherency and using other well known techniques, the desired signals are recovered at zero IF. These signals are then stored in capacitor type storages, such as 28 and 30, which may be similar to those described in the previously mentioned prior applications. These stored signals are then read out, according to a desirable and predetermined rapid and continuous process, through contiguous filters 32 and 34, each sector of which preferably includes limiters so that strong singal components will not mask other weak signal components.

At this time it may be worthwhile to emphasize that the echo pulse line spectrum, similar to FIG. 1, has been preserved intact, although shifted by the doppler. In other words, for an approaching target, most (or all) of the spectral responses will be in the upper sideband channel 12, 24, 28, and 32 while for a receeding target the preponderance of responses will be in the lower sideband channel 10, 26, 30 and 34. Further, the extent of the doppler shift is unambiguously retained and is, of course, the prime measure of the target velocity.

The outputs of the contiguous filters 32 and 34 are respectively connected to Offset and Combine units 36 and 38 which function, by obvious techniques, to restore the spectral frequency to the original order. The outputs of units 36 and 38 are respectively connected to Acceleration and Velocity Processor units 40 and 42 where, in a manner similar to that described in prior application, Ser. No. 649,792, each spectral response is analyzed (by matching) and, after being counted by counters 44 and 46, are placed together with similar signals from the other range bins in Data Storage and Conversion unit 48 for subsequent use in the radar display 50. Units 48 and 50, the details of which are not per se included in the present invention, are similar to analogous units described in the above mentioned prior application. The reader will realize, of course, that units 48 and 50 will be compatible with the wide range of velocity indication possible with the present invention and not limited, as were the previous analogous units, to unfolded indications of velocity only up to a doppler of PRF/2.

It will, by now, be evident that in the invention herein disclosed, the echo pulse line spectrum is preserved intact through the detection process and the upper and lower sideband responses counted. In the absence of a doppler shift of the pulse line spectrum, i.e., the target is neither approaching nor receeding, the sideband counts will be equal while in the presence of a doppler shift, a predominant upper sideband spectrum response count will indicate an approaching target. Although the precise indication of velocity and accleration is obtained from the processor units 40 and 42 and indicated by display unit 50, a secondary indication of the target velocity can be obtained by the extent of the predominance of one sideband count over the other. The reader will recognize that the predominance of the lower sideband response count would analogously be indicative for a receeding target. It will also be apparent that the herein disclosed method and apparatus for determining the direction and velocity of a target will avoid the ambiguities in the velocity and acceleration measurements which are present in prior radars when the doppler shift equalled or exceeded PRF/2.

It should be understood, of course, that the foregoing disclosure relates to only a preferred embodiment of the invention and that numerous modifications or alterations may be made therein without departing from the spirit and the scope of the invention as set forth in the appended claims.

What is claimed and desired to be secured by Letters Patent of the United States is:

1. The method of measuring the direction and velocity of a target by the use of a radar which radiates a series of pulses of electromagnetic energy having a predetermined frequency $f_o$ comprising the steps of:
    receiving the echoes of said series of pulses from said target;
    preserving the pulse line spectrum of said received echoes intact and without spectral folding by separating the response of the frequency components of said received echoes; and
    comparing the number of said separated responses which are received with frequencies above and below said predetermined frequency $f_o$ as an indication of the direction and velocity of said target.

2. The method of claim 1 including the further step of measuring the doppler frequency shift of said intact pulse line spectrum as an indication of target velocity.

3. The method of measuring the direction and velocity of a target by the use of a radar which radiates at a pulse repetition frequency $f_r$ a series of pulses of electromagnetic energy of a predetermined frequency $f_o$ comprising the steps of:
    receiving the echoes of said series of pulses from said target;
    obtaining the pulse line spectrum of said echoes by separating the frequency components of said received echoes and
    comparing the number of said frequency components which are received with frequencies above and below said predetermined frequency $f_o$ as an indication of the direction and velocity of said target.

4. The method of claim 3 wherein the step of obtaining said pulse line spectrum is accomplished by separating said frequency components by frequency increments of $f_r$ centered about said predetermined frequency $f_o$.

5. The method of claim 4 including the further step of measuring the doppler frequency shift of said pulse line spectrum as an indication of the velocity of said target.

6. Apparatus for measuring the direction and velocity of a target comprising:
    transmitting means for radiating pulses of electromagnetic energy of a predetermined r-f frequency $f_o$ at a pulse repetition frequency of $f_r$;
    receiving means for receiving the r-f echoes of said pulses from said target and translating said echoes to an i-f frequency;
    a contiguous filter having a bandpass spanning a predetermined frequency range centerd at an i-f frequency $f_o$ and connected to said receiving means, said contiguous filter including a plurality of sectors each having a bandpass $f_r$ wide centered at different frequencies; and
    counting means connected to said contiguous filter for counting the number of filter sectors having bandpasses above and below said predetermined frequency $f_o$ which pass signal components of said received echoes.

7. The apparatus of claim 6 and further including synchronous detecting, integration and signal processing means connected between said contiguous filter and said counting means for recovering weak signals.

8. Apparatus for measuring the direction and velocity of a target comprising:
    transmitting means for radiating pulses of electromagnetic energy of a predetermined r-f frequency $f_o$ at a pulse repetition frequency of $f_r$;
    receiving means for receiving the r-f echoes of said pulses from said target and translating said echoes to an r-f frequency;
    a plurality of range bins, each range bin including aa contiguous filter having a bandpass spanning a predetermined frequency range centered at an i-f frequency $f_o$, said contiguous filter including a plurality of sectors each having a bandpass $f_r$ wide centered at different frequencies and counting means connected to said contiguous filter for counting the number of filter sectors having bandpasses above and below said predetermined frequency $f_o$ which pass signal components of said received echoes and
    sampling means connected to said receiving means for sequentially connecting said receiver with individual ones of said plurality of range bins
    whereby the velocity, direction and range of said target is indicated by the count of said counting means and the particular range bin in which said count appears.

9. The apparatus of claim 8 wherein each range bin further includes synchronous detecting and signal processing means connected between said contiguous filter and said counting means for recovering weak signals and display means connected to said processing means for indicating the doppler frequency shift of said signal components as a measure of the velocity of said target.

* * * * *